United States Patent
Sabater et al.

(10) Patent No.: US 12,470,681 B2
(45) Date of Patent: Nov. 11, 2025

(54) METHOD AND APPARATUS FOR GENERATING COMPACT MULTIPLANE IMAGES

(71) Applicant: InterDigital CE Patent Holdings, SAS, Paris (FR)

(72) Inventors: Neus Sabater, Betton (FR); Julia Navarro, Palma (ES); Julien Fleureau, Rennes (FR); Guillaume Boisson, Pleumeleuc (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 53 days.

(21) Appl. No.: 18/272,472

(22) PCT Filed: Jan. 11, 2022

(86) PCT No.: PCT/EP2022/050469
§ 371 (c)(1),
(2) Date: Jul. 14, 2023

(87) PCT Pub. No.: WO2022/152709
PCT Pub. Date: Jul. 21, 2022

(65) Prior Publication Data
US 2024/0098235 A1  Mar. 21, 2024

(30) Foreign Application Priority Data

Jan. 14, 2021 (EP) .................................... 21305034

(51) Int. Cl.
H04N 13/161 (2018.01)
H04N 13/00 (2018.01)
(Continued)

(52) U.S. Cl.
CPC ......... *H04N 13/161* (2018.05); *H04N 13/139* (2018.05); *H04N 13/156* (2018.05); *H04N 13/194* (2018.05); *H04N 2013/0081* (2013.01)

(58) Field of Classification Search
CPC .. H04N 13/161; H04N 13/139; H04N 13/156; H04N 13/194; H04N 2013/0081;
(Continued)

(56) References Cited

U.S. PATENT DOCUMENTS 10,958,887 B2 * 3/2021 Kar ....................... H04N 23/632
11,055,521 B2 * 7/2021 Chandler ................ G06F 3/013
(Continued)

OTHER PUBLICATIONS

Li et al. "Synthesizing light field from a single image with variable MPI and two network fusion." ACM Trans. Graph. 39.6 (2020): 229-1. (Year: 2020).*
(Continued)

*Primary Examiner* — Boubacar Abdou Tchoussou
(74) *Attorney, Agent, or Firm* — Condo Roccia Koptiw LLP

(57) ABSTRACT

Methods and devices for generated multiplane images from a representation of a 3D scene are disclosed. When an MPI is generated by the system, an image of the accumulation of the alpha values is computed. A convolutional networked is trained with a penalization function that penalizes MPIs with high values of accumulated alpha according to a parameter selected or trained to reduce the redundancy of information between layers of the MPI. When generating a MPI from a subset of the views of a new captured 3D scene, a first MPI is generated with the trained CNN with the associated parameter. An error is calculated between the other views and corresponding synthesized with the first MPI. This error is used to modify the parameter. Then, a second MPI is generated with the trained CNN with the new parameter.

12 Claims, 3 Drawing Sheets

(51) Int. Cl.
*H04N 13/139* (2018.01)
*H04N 13/156* (2018.01)
*H04N 13/194* (2018.01)

(58) Field of Classification Search
CPC ...... H04N 19/597; H04N 19/21; G06N 3/045; G06N 3/084
See application file for complete search history.

(56) References Cited

U.S. PATENT DOCUMENTS

| | | | |
|---|---|---|---|
| 11,172,148 B2* | 11/2021 | Overbeck | H04N 25/41 |
| 11,695,914 B2* | 7/2023 | Xu | H04N 13/395 |
| | | | 345/419 |
| 11,887,256 B2* | 1/2024 | Bertel | G06V 10/82 |
| 2020/0226816 A1 | 7/2020 | Kar et al. | |
| 2023/0156171 A1* | 5/2023 | Krener-Iversen | H04N 13/368 |
| | | | 348/51 |

OTHER PUBLICATIONS

Lu et al, "Layered Neural Rendering for Retiming People in Video", Association for Computing Machinery, ACM Transactions on Graphics, vol. 39, Issue 6, Article 256, Dec. 2020, 14 pages.

Broxton et al, "Immersive Light Field Video with a Layered Mesh Representation", ACM Transactions on Graphics, vol. 39, Issue 4, Article 86, Jul. 2020, 15 pages.

Zhou et al., "Stereo Magnification: Learning View Synthesis using Multiplane Images", Association for Computing Machinery, ACM Transactions on Graphics, vol. 37, Issue 4, Article 65, Aug. 2018, 12 pages.

Navarro et al, "Compact and Adaptive Multiplane Images for View Synthesis", Cornell University Library, Computer Science, Computer Vision and Pattern Recognition, Document: arXiv:2012.10086v1, Feb. 19, 2021, 5 pages.

Volker et al., "Learning Light Field Synthesis with Multi-Plane Images: Scene Encoding as a Recurrent Segmentation Task", Institute of Electrical and Electronics Engineers (IEEE), 2020 IEEE International Conference on Image Processing (ICIP), Abu Dhabi, United Arab Emirates, Oct. 25, 2020, 5 pages.

Vandame et al., "Pipeline for Real-Time Video Synthesis", Institute of Electrical and Electronics (IEEE), 2020 IEEE International Conference on Multimedia & Expo Workshops (ICMEW), London, United Kingdom, Jul. 6, 2020, 6 pages.

* cited by examiner

METHOD AND APPARATUS FOR GENERATING COMPACT MULTIPLANE IMAGES

CROSS REFERENCE TO RELATED APPLICATIONS

This application is a U.S. National Stage Application under 35 U.S.C. § 371 of International Patent Application No. PCT/EP2022/050469, filed Jan. 11, 2022, which is incorporated herein by reference in its entirety.

This application claims priority to European Application No. 21305034.7, filed Jan. 14, 2021, which is incorporated herein by reference in its entirety.

TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD). The present principles particularly relate to the generating of volumetric scenes as a multi-plane image.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A multiplane image (MPI) is a layered representation of a volumetric scene where each layer is a slice of the 3D space of the scene. Each slice is sampled according to an underlying central projection (e.g. perspective, spherical, . . . ) and a sampling law which defines the interlayer spacing. A layer is an image that comprises color as well as transparency information of any 3D intersecting object of the scene. From this sliced representation, it is possible to recover/synthesize any viewpoint located in a limited region around the center of the underlying projection. It can be performed making use of efficient algorithms (e.g. "reversed" Painter's algorithm) which blend each layer with the proper weights (i.e. transparency) starting from the nearest to the furthest layer. Such techniques may run very faster than other known view synthesis processes.

However, MPIs are bulky and despite their advantages for view synthesis, the memory footprint (W×H pixels×D depth layers×4 channels (e.g. RGBA)) is a drawback for some applications. A way to encode volumetric scenes is to pack samples of projected parts of the scene (called patches) into a large image (called atlas). It is possible to encode a MPI as a patch atlas, for example, by partitioning layers of an MPI in patches. Only those that are significant, that is with non-zero alpha values, are kept and packed into an atlas. However, such a representation tends to require bigger atlases than other representation of the volumetric scene. In addition, MPIs may comprise fully filled layers, for instance MPIs generated by neural networks. This is because, for a given 3D scene, several MPIs may generate a good rendering.

Mechanisms to actively generate compact MPIs composed of a controlled number of layers comprising large transparent areas are missing for overcoming the memory footprint bottleneck, for instance in preparation of an encoding as an atlas.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method for generating a multiplane image, comprising:
  acquiring a multiview image of a 3D scene comprising n views; and
  generating the multiplane image by inputting a subset of n−s views of the multiview image and a parameter in a trained convolutional neural network; the parameter being used to determine the redundancy of information between layers of the multiplane image.

In a particular embodiment, the method further comprises:
  using the multiplane image to synthesize s views corresponding to views n−s+1 to n and determining a new parameter by comparing the synthesized views to the corresponding views of the multiview image; and
  regenerating the multiplane image by inputting the n views of the multiview image and the new parameter in the trained convolutional neural network.

In some embodiments, the parameter is a function of coordinates of pixels of the multiplane image. In an embodiment, the method further comprises encoding the multiplane image in a data stream; and transmitting the data stream to a client device or storing the data stream in a memory.

The present principles also relate to a device comprising an image acquisition system configured for acquiring a multiview image of a 3D scene comprising n views; and a processor associated with a memory and configured for generating the multiplane image by inputting a subset of n−s views of the multiview image and a parameter in a trained convolutional neural network; the parameter being used to determine the redundancy of information between layers of the multiplane image.

In an embodiment, the processor is further configured for:
  using the multiplane image to synthesize s views corresponding to views n−s+1 to n and determining a new parameter by comparing the synthesized views to the corresponding views of the multiview image; and
  regenerating the multiplane image by inputting the n views of the multiview image and the new parameter in the trained convolutional neural network.

The parameter may be a function of coordinates of pixels of the multiplane image. Additionally, the device may further comprise:
  an encoder configured for encoding the multiplane image in a data stream; and
  a transmitter configured for transmitting the data stream to a client device or a memory for storing the data stream.

The present principles also relate to a method for training a convolutional network to generate a multiplane image. The method comprises:

obtaining first data representative of a 3D scene;
inputting the first data in the convolutional network to generate the multiplane image; and
adapting the convolutional network according to the multiplane image and to a penalization function determined according to an accumulated alpha image of the multiplane image and according to a parameter used to determine the redundancy of information between layers of the multiplane image.

In a particular embodiment, the method further comprises:

analyzing the multiplane image to determine second data representative of a disparity and/or a total visibility and/or an accumulated alpha of the multiplane image;
inputting the second data in a second convolutional network to generate a new parameter and adapting the second convolutional network according to the new parameter;
iterating the method with the new parameter.

The parameter may be a function of coordinates of pixels of the multiplane image.

The present principles also relate to device comprising a memory associated with a processor configured for implementing the above method for training a convolutional network to generate a multiplane image.

BRIEF DESCRIPTION OF DRAWINGS

The present disclosure will be better understood, and other specific features and advantages will emerge upon reading the following description, the description making reference to the annexed drawings wherein.

DETAILED DESCRIPTION OF EMBODIMENTS

Figure 1:
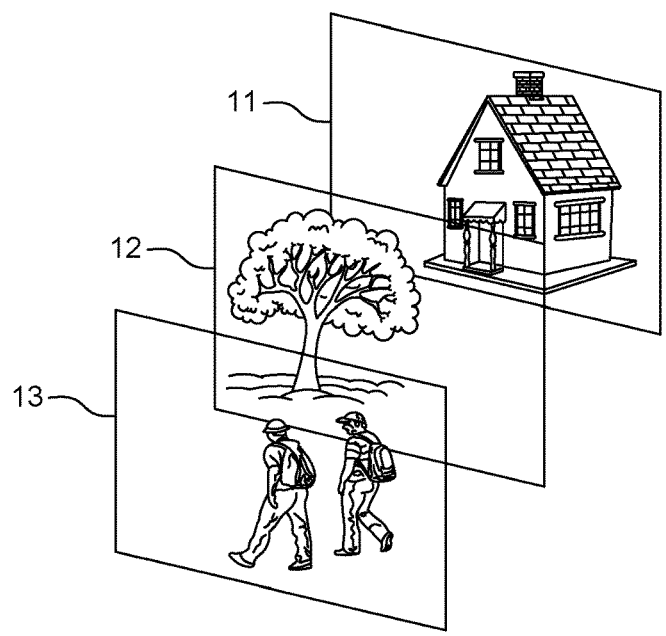
FIG. 1 shows a representation of a multi-plane image.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a representation of a multi-plane image. In the example of FIG. 1, the MPI is composed of three layers 11, 12 and 13 from the background to the foreground according to a perspective center of projection. The number of layers and the part of the volumetric scene projected onto each layer may vary. For instance, the two characters of layer 13 may be represented on two separate layers (e.g. if or when one of them partially masks the other one). The distance between each layer may also vary to be representative of the difference of depth (i.e. distance to the center of projection) of objects represented onto two consecutive layers. The type of projection may differ too. For instance, a panoramic MPI would be represented as concentric cylinders. A 360° MPI would be represented as concentric spheres or cubes, for example.

From this sliced representation, it is possible to synthesize any viewpoint located in a limited region around the center of the underlying projection. It can be done making use of efficient alpha compositing algorithms which blend each layer with the proper weights (transparency) starting from the nearest to the furthest. According to the location of the viewpoint, occultations of objects of the background by objects of the foreground may differ, allowing an observer to experience a parallax effect and to perceive the volume of the scene by lightly moving his head.

Figure 2:
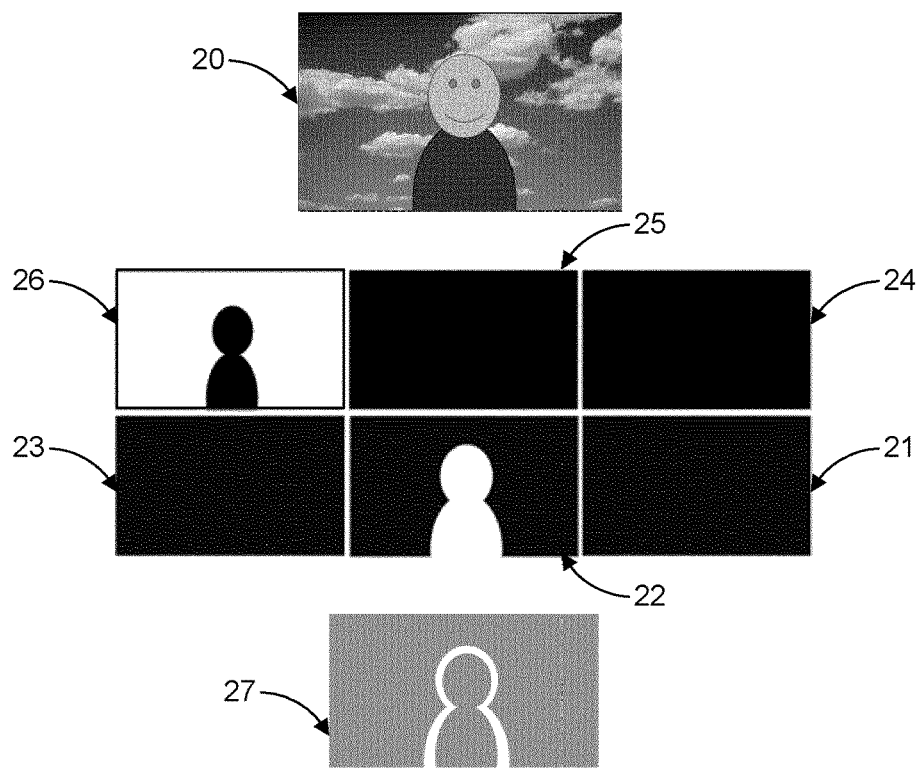
FIG. 2 diagrammatically illustrates an example of the alpha channel (transparency) of an MPI representative of a simple 3D scene.

FIG. 2 diagrammatically illustrates an example of the alpha channel (transparency) of an MPI representative of a simple 3D scene. In the example of FIG. 2, a 3D scene 20 is captured. The scene comprises is a person in the foreground and the sky in the background. Thus, there are two elements at two different depths ($z_{per}$ for the person and $z_{back}$ for the sky) from the acquisition system. Ideally, for the sake of compactness, only two layers of the MPI should have non-zero alpha values. A non-zero alpha value for a pixel corresponding to the presence of an object of the scene at the corresponding location and depth. In the example of FIG. 2, the MPI comprises six layers 21 to 26, layer 21 being the closest from the acquisition system (i.e. has the lowest depth), layer 26 being the furthest (i.e. the acquired part of the sky). Layer 22 is located at $z_{per}$. Pixels of layer 22 corresponding to the person are in white (i.e. alpha equal to 1, that is completely opaque), others pixels being in black (i.e. alpha equal to 0, that is totally transparent). Layer 26, corresponding to the background $z_{back}$ is white everywhere unless the region that is not visible by any of the cameras of the acquisition system, behind the foreground object. This part is black (alpha equal to 0). The black region in layer 26 is smaller than the white region in layer 22. This is because when rendering a novel view with a different viewpoint, some new parts of the sky will become visible and will appear in the final view. So, these semi-occluded regions are stored in the MPI. Layers 21 and 23 to 25 are entirely black because they do not contain any opaque object. These layers are totally transparent, but they are encoded in the MPI because, it is not a priori known that they are empty.

The alpha channel of the layers of the MPI may be summed all to obtain the accumulated alpha image 27 defined as $A(x, y)=\Sigma_d \alpha(x, y, d)$, that is the sum, for every layer, of the alpha value of a pixel (x,y) in layer d. Accumulated alpha image 27 contains color information for each pixel (x,y). Most of the pixels have been stored in only one layer, so their value is equal to 1 (in grey). However, pixels corresponding to the semi-occlusions have an accumulated value equal to 2 (in white). The semi-occluded region depends on the acquisition system (e.g. on the view baseline of the acquisition system) and the distance between the objects (i.e. depth difference). The bigger the baseline and the object depth difference, the bigger the semi-occluded region.

Figure 3:
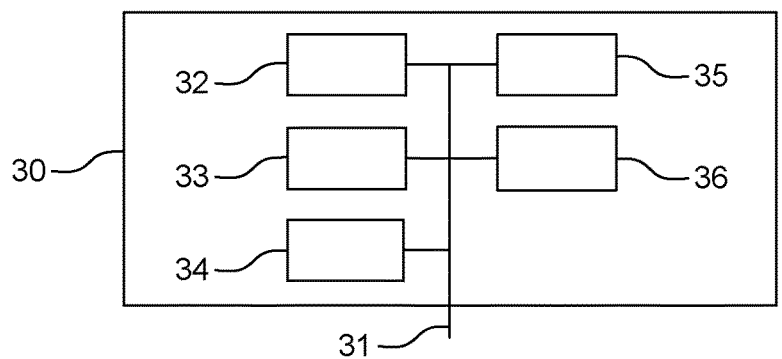
FIG. 3 shows an example architecture of a device 30 which may be configured to implement a method described in relation with FIGS. 5 and 6, according to a non-limiting embodiment of the present principles.
Figure 5:
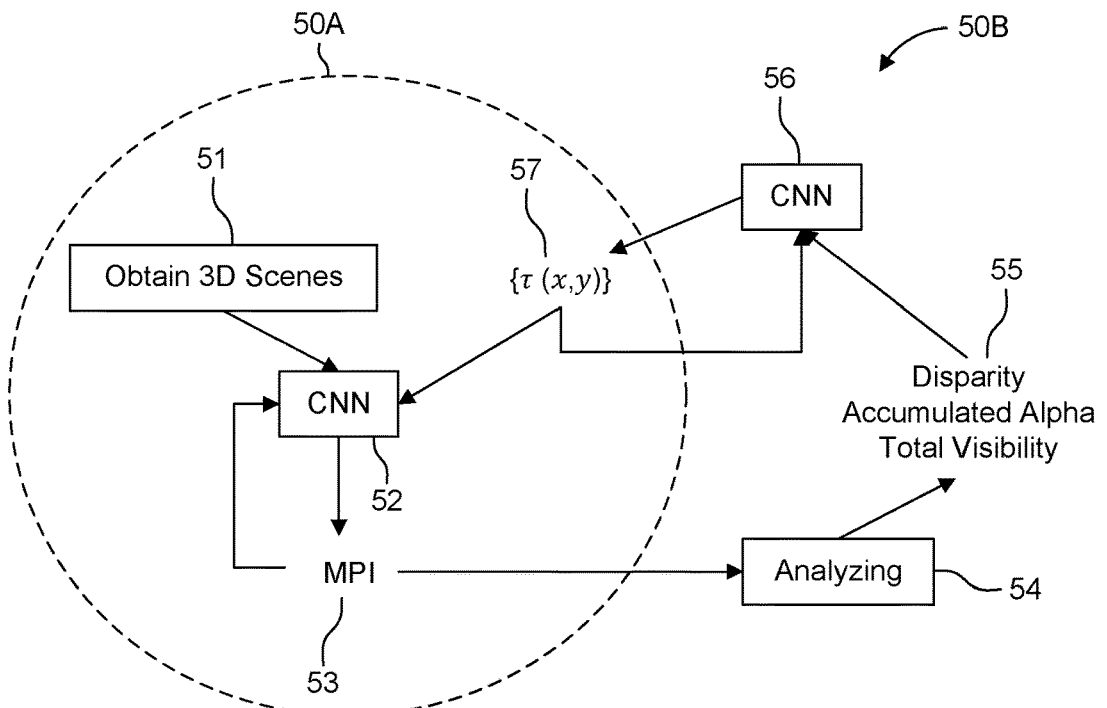
FIG. 5 illustrates a non-limiting embodiment of two methods to generate a multiplane image according to a parameter r of the penalization term.
Figure 6:
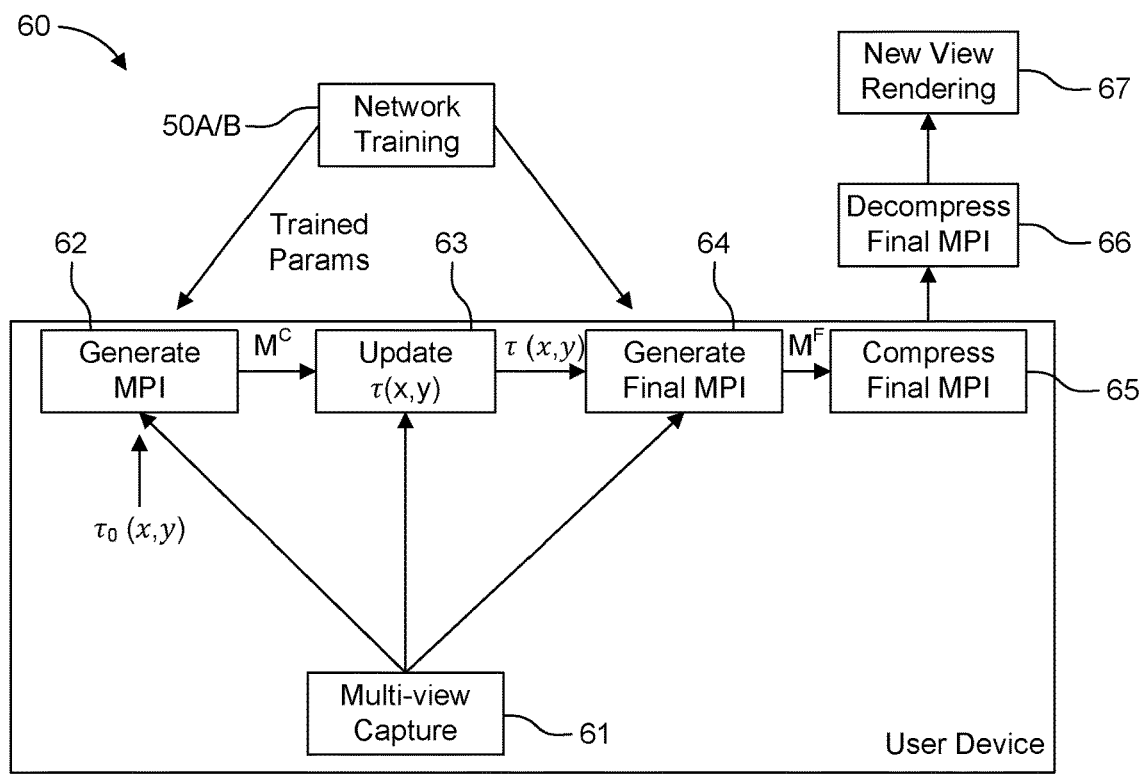
FIG. 6 diagrammatically shows a method 60 for generating an MPI that adapt the compacity of the MPI, according to a non-limiting embodiment of the present principles.

FIG. 3 shows an example architecture of a device 30 which may be configured to implement a method described in relation with FIGS. 5 and 6. This architecture implements, for example, methods 50 or 60 of FIGS. 5 and 6. Alternatively, each circuit (e.g. first and/or second CNN) of FIGS. 5 and 6 may be a device according to the architecture of FIG. 3, linked together, for instance, via their bus 31 and/or via I/O interface 36.

Device 30 comprises following elements that are linked together by a data and address bus 31:
a microprocessor 32 (or CPU), which is, for example, a DSP (or Digital Signal Processor);
a ROM (or Read Only Memory) 33;
a RAM (or Random Access Memory) 34;
a storage interface 35;
an I/O interface 36 for reception of data to transmit, from an application; and
a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with 9, and belongs to a set comprising:
a mobile device;
a communication device;
a game device;
a tablet (or tablet computer);
a laptop;
a still picture camera rig;
a video camera;
an encoding chip;
a server (e.g. a broadcast server, a video-on-demand server or a web server).

Figure 4:
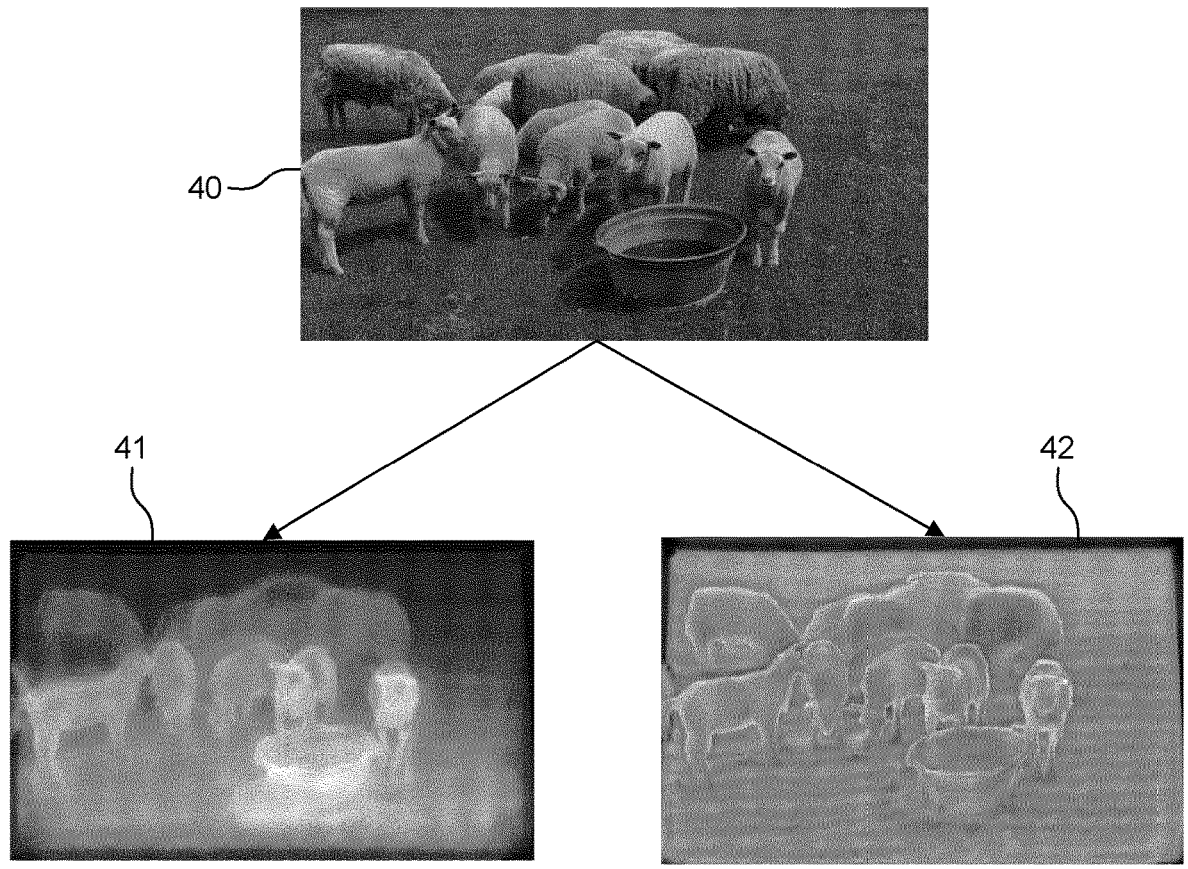
FIG. 4 shows two accumulated alpha images, for a same acquisition of a 3D scene, obtained according to different non-limiting embodiments of the present principles.

FIG. 4 shows two accumulated alpha images 41 and 42, for a same acquisition of a 3D scene 40, obtained according to different methods. Resulting accumulated alpha image 41 is obtained by summing alpha channel of layers of an MPI generated by a neural network trained to generates MPI with 32 layers. Neural networks tend to fully fill the MPI volume (i.e., for every layer, most of the resulting alpha values are non-null or bigger than a threshold). This is because there is not a unique MPI that will generate a good rendering. In fact, there are several solutions that will generate views of similar quality. In general, neural networks provide one of such MPI solutions that allow to render the best synthesized view, but there are not designed to render compact MPIs that will be suitable for compression techniques. Accumulated alpha image 41 is obtained by summing the alpha channel of the 32 layers of an MPI obtained with a neural network; such an MPI is not compact but allows to generate high quality view synthesis. In the example of accumulated alpha image 41, some pixels have no less than 18 layers with a stored RGB value. While it is important to store more than one RGB value for semi-occluded regions (or semi-transparent objects), it is clear that neural networks do not fill MPIs in an optimal manner. Most of the information in the MPI is redundant and will not be used to synthesize the view with the alpha compositing operations. So, it is useless to store such a big amount of information in the MPI volume.

According to the present principles, the neural network is trained to compute MPIs that have all the important information without storing it many times. Accumulate alpha image 42 is obtained by using a convolutional neural network (CNN) trained according to the present principles detailed below. Image 42 has accumulated alpha values belonging to a range [0, 3.38]. The MPI is more compact. If an atlas needs to be computed afterwards based on the MPI, the memory footprint will significantly decrease because the alpha values will be zero for the vast majority of pixel locations. In other words, according to the present principles, redundancies are avoided in the MPIs and only the meaningful information is kept.

According to the present principles, during the learning process, the resulting MPIs having high values in the accumulated alpha image are penalized. For instance, the penalization term may be defined according to equation Eq. 1.

$$L_{MPI} = \frac{1}{WH} \sum_{(x,y)} \max(A(x, y) - \tau, 0) \qquad \text{Eq. 1}$$

where W, H are the image width and height, A(x,y) is the accumulated alpha value at pixel (x,y) in the image and τ is a parameter. The penalization term $L_{MPI}$ that forces the network to learn how to output compact MPIs, can be combined with other penalization terms. For example, the final loss network can be defined as $L+\lambda L_{MPI}$, L being, for instance, the $L^1$ norm and λ a parameter balancing the two terms.

In a first embodiment, parameter τ is a fixed value equal to 2 or 3, for instance. The MPIs having more than 2 or 3 stored values per pixel are penalized. A parameter τ equal to 1 is enough for most of the pixels in the case when there are not occlusions in the 3D scene (which is very unlikely). In practice, due to the depth discretization of the MPI volume, some parts of the slanted surfaces may need to be stored in two depth planes to better be recovered regardless of the occlusion.

In a second embodiment, parameter τ is a parameter that is learnt by the network. This parameter can be initialized with its value equal to 2 or 3 for instance. This embodiment is similar to the fourth embodiment described in relation to FIG. 5, with a single parameter τ applied to every pixel of the MPI.

In a third embodiment, parameter τ has different values depending on a position in the image: τ(x,y). Total visibility is an estimation of how many cameras 'see' a voxel (x, y, d). A voxel (x, y, d) is the volume of the space encoded in pixel (x,y) of the layer d of the MPI. A total visibility value is determined as the sum of the MPI visibility V* across all views v of a multiview image representative of the 3D scene, according to equation:

$$\overline{V}_{x,y,d} = \sum_v V^+_{v,x,y,d}$$

Where the view visibility $V^*_{v,x,y,d}$ indicates the visibility of each voxel with respect to each view v. $V^*_{v,x,y,d}$ is computed from the channel alpha of the MPI and the warping operators that allow to project one image plane to another using the calibration parameters.

In this third embodiment, the total visibility is a volume of the same size and in the same reference coordinate system than the MPI alpha channel. Each voxel (x, y, d) in $\overline{V}$ encodes the number of views that directly see that voxel with values ranging from 0 to the number of considered input views $V_{max}$. Parameter τ(x, y) is determined as a function of the total visibility. If $\overline{V}_{x,y,d}=V_{max}$, meaning that all cameras see the given voxel, τ(x, y) should take small values (e.g., equal to 2). Otherwise, τ(x, y) should increase. Indeed, if only a limited number of cameras see the voxel, it means that it is a semi-occluded region of the scene and the foreground and background objects should be stored in different planes (e.g., equal to 3).

FIG. 5 illustrates a non-limiting embodiment of two methods 50A and 50B to generate a multiplane image according to a parameter τ of the penalization term. Method 50A comprises steps 51 and 52. Method 50B takes the output MPI 53 of method 50A as input and update parameter 57 as output. Method 50B comprises method 50A and steps 54 and 56.

In a step 51, data representative of 3D scenes are obtained. The 3D scene may be represented, for example, as Multi-View Images (MVIs), or, for instance, as Plane Sweep Volumes (PSV). In a step 52, these data are inputted in a first CNN configured according to the present principles. An MPI 53 is generated by the first CNN. First CNN of step 52 uses a set 57 of parameters {τ(x, y)} used in the penalization term to backpropagate an error determined according to the generated MPI 53. Steps 51 and 52 are iterated in the methods of the previous embodiments. At each iteration the first CNN provides the residual Δ that is added to the final MPI volume. The CNN computes iteratively the final MPI. At each iteration, the CNN computes the residual Δ that is added to the MPI obtained at previous iteration. This scheme may also be applied when only the alpha channel of the MPI is trained. In the first and second embodiments, parameter τ does not depend on the coordinates of pixels. Accordingly, for the first and second embodiments, set 57 is defined as a single value τ that applies to any pixel of the MPI to generate.

In the fourth embodiment, MPI 53 is analyzed in a step 54 to determine data 55. Data 55 comprises a representation of a disparity of MPI 53 and/or the accumulated alpha of the MPI, for instance represented by an image, and/or the total visibility of MPI 53 as described in relation to the second embodiment. At a step 56 data 55 are used as input of a second CNN that outputs a new set 57 of parameters {τ(x, y)}. Steps 54 and 56 can be processed for every iteration of steps 51 and 52 or only for some of them. If steps 54 and 56 are performed only for the last iterations of steps 51 and 52, the scheme of FIG. 5 first estimates the best MPI and then modifies the best MPI to be as compact as possible.

FIG. 6 diagrammatically shows a method 60 for generating an MPI that adapt the compacity of the MPI. Method 60 may be implemented on the device that captures the multi-view content. A first CNN has been trained by method 50 (with or without steps 52 and 54) to generate compact MPIs. In a step 61, a 3D scene is captured, for example as a Multiview Image comprising n views of the 3D scene captured from different locations of the 3D space. At a step 62, a first instance of the first CNN is inputted with last parameters 57 of method 50 (or with default parameters) and with a subset of n−s views ($I_1$ to $I_{n-s}$) of the captured n views to generate a first MPI $M^c$. The first CNN is trained to generate a compact MPI, that is to reduce as much as possible the amount of redundant data. At a step 63, the MPI $M^c$ is used to synthesize views $\hat{I}_{n-s+1}$ to $\hat{I}_n$, as seen from the location (and orientation) of $I_{n-s+1}$ to $I_n$ (i.e. the view unused at step 62). The resulting views are compared to the real captured views to determine an error between $\hat{I}_x$ and $I_x$. A global error is obtained, for example, by summing the individual errors. This error may be determined pixel by pixel. For some pixels, the error is larger than for others. Indeed, for some 3D scenes, a very compact MPI may not recover accurately the view. For instance, many thin objects with different occlusions may not be correctly represented with an MPI with τ being equal to 2 or 3. Consequently, the values of τ(x, y) will be updated according to the error between $\hat{I}_n$ and $I_n$. The larger the error for a pixel (x, y), the more increase of τ(x, y). At a step 64, a second instance of the first CNN trained by method 50 is inputted by the updated parameters and the n captured view to generate a final MPI $M^F$. The present method keeps the MPI compact when the view synthesis is of good quality and allows more redundancy of the information through the layers of the MPI when the original result is not performed as the original. According to the present principles, a trade-off between compacity and quality is performed.

In an optionally step 65, MPI $M^F$ may be encoded as an atlas and/or may be compressed and transmitted to a decoder. In a step 66, the encoded and/or compressed MPI is decompressed or/and the patches of the atlas or the MPI are used to synthesize at least one view from a location in the viewing region at a step 67.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for generating a multiplane image, comprising:
   acquiring a multi-view image of a 3D scene comprising n views, indexed from 1 to n;

generating a first multiplane image by inputting views of the multi-view image indexed by 1 to n−1 and a set of at least one parameter in a convolutional neural network trained to generate a multiplane image representative of a multi-view image, the set of at least one parameter being used in a penalization term of the convolutional neural network to determine a redundancy of information between layers of the multiplane image;

synthetizing the n-th view based on the first multiplane image;

updating the set of at least one parameter responsive to a comparison between the synthetized n-th view and the n-th view of the multi-view image; and generating a second multiplane image by inputting the n views of the multi-view image and the updated set of at least one parameter in the convolutional neural network.

2. The method of claim 1, wherein the set of at least one parameter comprises one parameter per spatial position of pixels of the multiplane image.

3. The method of claim 1, further comprising:
encoding the second multiplane image in a data stream; and
transmitting the data stream to a client device or storing the data stream in a memory.

4. A device for generating a multiplane image, comprising:
an image acquisition system configured for acquiring a multi-view image of a 3D scene comprising n views indexed from 1 to n; and
a processor associated with a memory and configured to perform:
generating a first multiplane image by inputting views of the multi-view image indexed by 1 to n−1 and a set of at least one parameter in a convolutional neural network trained to generate a multiplane image representative of a multi-view image, the set of at least one parameter being used in a penalization term of the convolutional neural network to determine a redundancy of information between layers of the multiplane image;
synthetizing the n-th view based on the first multiplane image;
updating the set of at least one parameter responsive to a comparison between the synthetized n-th view and the n-th view of the multi-view image; and
generating a second multiplane image by inputting the n views of the multi-view image and the updated set of at least one parameter in the convolutional neural network.

5. The device of claim 4, wherein the set of at least one parameter comprises one parameter per spatial position of pixels of the multiplane image.

6. The device of claim 4, further comprising:
an encoder configured for encoding the second multiplane image in a data stream; and
a transmitter configured for transmitting the data stream to a client device or a memory for storing the data stream.

7. A method for training a convolutional neural network to generate a multiplane image, the method comprising:
obtaining first data representative of a 3D scene;
inputting the first data in the convolutional neural network to generate the multiplane image; and
adapting the convolutional neural network according to the multiplane image and to a penalization function determined as a normalized sum over pixels of an accumulated alpha image of the multiplane image of a maximum value between zero and a difference, the difference being between a value of the accumulated alpha image at the pixel and a parameter of a set of at least one parameter, the set of at least one parameter being used to determine a redundancy of information between layers of the multiplane image.

8. The method of claim 7, further comprising:
analyzing the multiplane image to determine second data representative of a disparity and/or a total visibility and/or an accumulated alpha of the multiplane image;
inputting the second data in a second convolutional neural network to generate a new set of at least one parameter and adapting the second convolutional neural network according to the new set of at least one parameter; and
iterating the method with the new set of at least one parameter.

9. The method of claim 7, wherein the set of at least one parameter comprises one parameter per spatial position of pixels of the multiplane image.

10. A device for training a convolutional neural network to generate a multiplane image, the device comprising a memory associated with a processor configured for applying a training process comprising:
obtaining first data representative of a 3D scene;
inputting the first data in the convolutional neural network to generate the multiplane image; and
adapting the convolutional neural network according to the multiplane image and to a penalization function determined as a normalized sum over pixels of an accumulated alpha image of the multiplane image of a maximum value between zero and a difference, the difference being between a value of the accumulated alpha image at the pixel and a parameter of a set of at least one parameter, the set of at least one parameter being used to determine a redundancy of information between layers of the multiplane image.

11. The device of claim 10, wherein the processor is further configured for:
analyzing the multiplane image to determine second data representative of a disparity and/or a total visibility and/or an accumulated alpha of the multiplane image;
inputting the second data in a second convolutional neural network to generate a new set of at least one parameter and adapting the second convolutional neural network according to the new set of at least one parameter; and
iterating the training process with the new set of at least one parameter.

12. The device of claim 10, wherein the set of at least one parameter comprises one parameter per spatial position of pixels of the multiplane image.

* * * * *